(12) United States Patent
Amin et al.

(10) Patent No.: US 7,280,503 B2
(45) Date of Patent: *Oct. 9, 2007

(54) TDMA MESSAGING SERVICE MICROCELL

(75) Inventors: Umesh J. Amin, Redmond, WA (US); Michael Buhrmann, Redmond, WA (US)

(73) Assignee: Cingular Wireless II, LLC, Atlanta, GA (US)

( * ) Notice: Subject to any disclaimer, the term of this patent is extended or adjusted under 35 U.S.C. 154(b) by 39 days.

This patent is subject to a terminal disclaimer.

(21) Appl. No.: 11/243,392

(22) Filed: Oct. 3, 2005

(65) Prior Publication Data

US 2006/0029019 A1 Feb. 9, 2006

Related U.S. Application Data

(63) Continuation of application No. 09/168,919, filed on Oct. 9, 1998, now Pat. No. 7,012,903, which is a continuation of application No. 08/672,769, filed on Jun. 28, 1996, now Pat. No. 5,875,187.

(51) Int. Cl.
*H04Q 7/00* (2006.01)

(52) U.S. Cl. .................................... 370/329

(58) Field of Classification Search ............... 370/328, 370/329, 336, 337, 345, 347, 313, 314; 455/450, 455/507, 504, 511–517, 466
See application file for complete search history.

(56) References Cited

U.S. PATENT DOCUMENTS

| | | | |
|---|---|---|---|
| 4,736,371 A | 4/1988 | Tejima et al. | |
| 4,797,654 A | 1/1989 | Young et al. | |
| 4,845,491 A | 7/1989 | Fascenda et al. | |
| 4,943,973 A * | 7/1990 | Werner ....................... | 375/141 |
| 5,115,233 A | 5/1992 | Zdunek et al. | |
| 5,153,902 A | 10/1992 | Buhl et al. | |
| 5,155,742 A | 10/1992 | Ariyavisitakul et al. | |

(Continued)

FOREIGN PATENT DOCUMENTS

CA    2182598    8/1995

(Continued)

OTHER PUBLICATIONS

International Search report, PCT/US97/09034, 1997, 1page.*

(Continued)

*Primary Examiner*—Dmitry Levitan
(74) *Attorney, Agent, or Firm*—Michael J. Donohue; David Wright Tremaine LLP

(57) ABSTRACT

A cellular messaging network includes a switching controller connected to the wireless telephone network. One or more base station micro/picocell retransmitters are coupled to the switching controller. The base station micro/picocell transmitter uses simplified control equipment having no digital traffic channel capability. Each base station micro/picocell retransmitter is able to discriminate between voice channel assignment signals and short messaging signals in the digital control channel, discard the voice channel assignment signals, and rebroadcast the short messaging signals in the digital control channel. One or more receivers are coupled to the base station micro/picocell retransmitters by way of an IS-136 protocol digital control channel. The base station micro/picocell retransmitter can be connected to the switching controller through a twisted-pair telephone line.

24 Claims, 2 Drawing Sheets

U.S. PATENT DOCUMENTS

| | | | |
|---|---|---|---|
| 5,172,375 | A | 12/1992 | Kou |
| 5,214,789 | A | 5/1993 | George |
| 5,287,348 | A | 2/1994 | Schmidt et al. |
| 5,381,412 | A | 1/1995 | Otani |
| 5,436,899 | A | 7/1995 | Fujino et al. |
| 5,455,823 | A | 10/1995 | Noreen et al. |
| 5,511,110 | A | 4/1996 | Drucker |
| 5,539,744 | A | 7/1996 | Chu et al. |
| 5,572,347 | A * | 11/1996 | Burton et al. .................. 398/71 |
| 5,577,046 | A * | 11/1996 | Diachina et al. ............ 370/252 |
| 5,625,629 | A | 4/1997 | Wenk |
| 5,745,492 | A * | 4/1998 | Nakamura et al. .......... 370/435 |
| 5,761,623 | A * | 6/1998 | Lupien et al. ............ 455/552.1 |
| 5,806,000 | A * | 9/1998 | Vo et al. ...................... 455/466 |
| 5,822,700 | A * | 10/1998 | Hult et al. ................... 455/466 |
| 5,875,187 | A | 2/1999 | Amin et al. |
| 5,903,726 | A * | 5/1999 | Donovan et al. ........... 709/206 |
| 6,014,089 | A | 1/2000 | Tracy et al. |
| 6,046,990 | A | 4/2000 | Chennakeshu et al. |
| 6,175,743 | B1 * | 1/2001 | Alperovich et al. ........ 455/466 |
| 6,314,081 | B1 * | 11/2001 | Chennakeshu et al. ..... 370/203 |

FOREIGN PATENT DOCUMENTS

| | | |
|---|---|---|
| EP | 0 535 890 | 4/1993 |
| WO | WO93/06684 | 4/1993 |
| WO | WO95/12934 | 5/1995 |

OTHER PUBLICATIONS

"Software for a United States TDMA System Cellular Portable Telephone," *Oki Technical Review*, pp. 59-62 (Dec. 1995).

J. Spragins et al., "Telecommunications Protocol and Design," pp. 323-327, Feb. 1991.

* cited by examiner

| 24 | 26 | 28 | 30 | 32 | 34 | | | | |
|---|---|---|---|---|---|---|---|---|---|
| SYNC | OH | VCA | SMS | SMS | SMS | | | | |

22

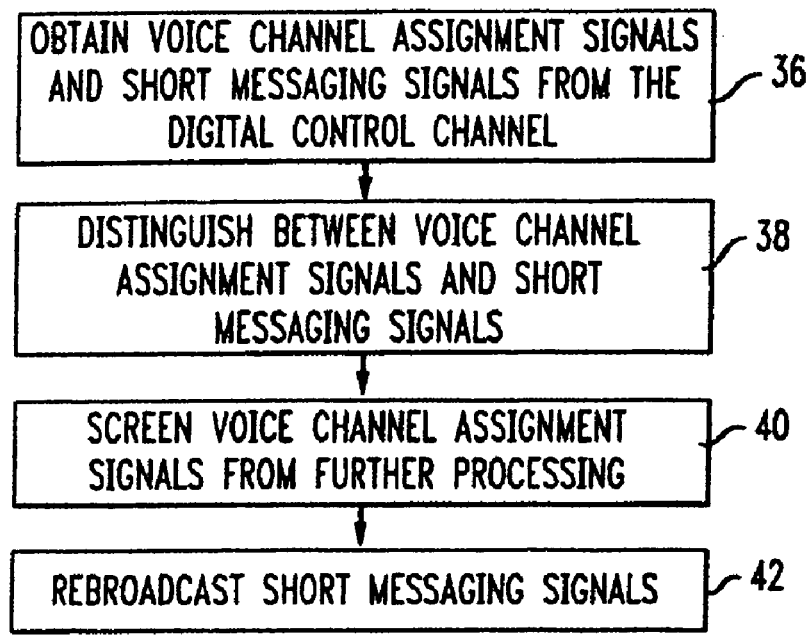
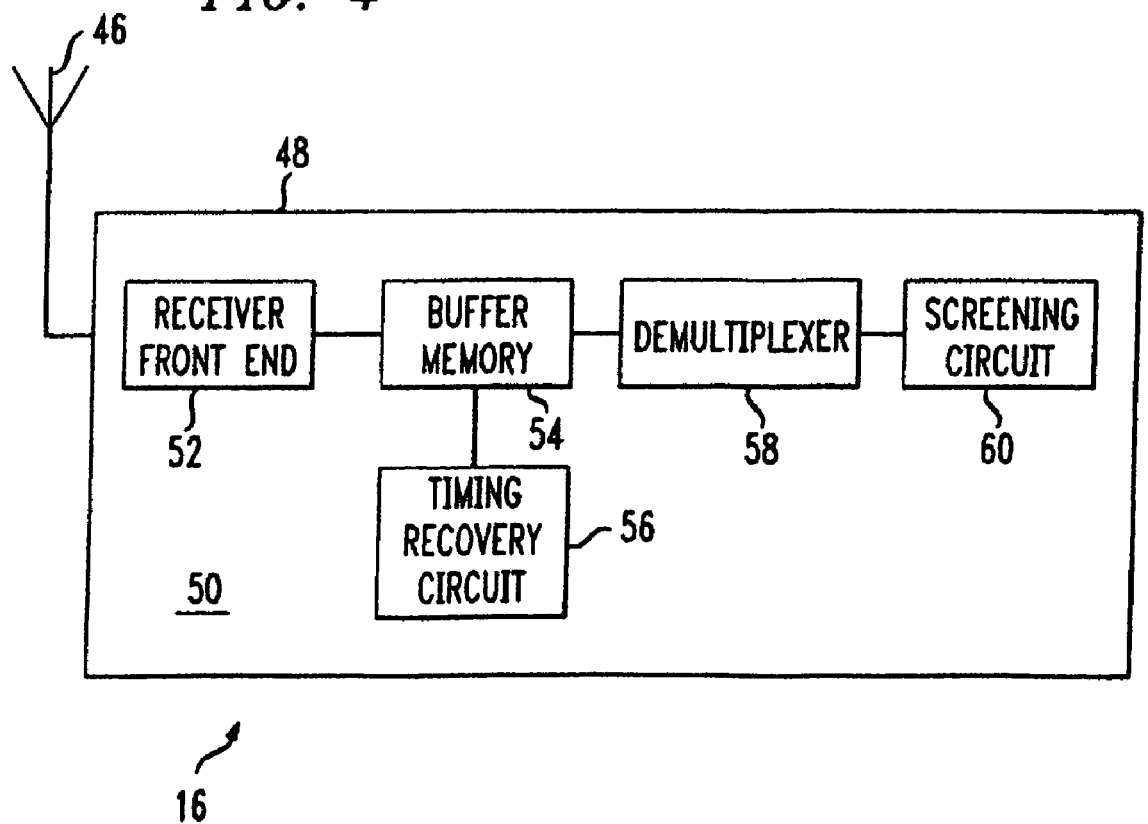

TDMA MESSAGING SERVICE MICROCELL

CROSS-REFERENCE TO RELATED APPLICATIONS

This application is a continuation of application Ser. No. 09/168,919, filed Oct. 10, 1998, now U.S. Pat. No. 7,012,903 which is a continuation of application Ser. No. 08/672,769, filed Jun. 28, 1996, now U.S. Pat. No. 5,875,187, both of which are incorporated herein by reference.

FIELD OF THE INVENTION

This invention relates generally to cellular telecommunications and more particularly to a cellular messaging network.

BACKGROUND OP THE INVENTION

There has been a remarkable increase in the demand for portable telephones in metropolitan areas. However, analog systems are increasingly unable to cover the increase in the number of portable telephone subscribers. Accordingly, to address this increase, operation of a commercial digital cellular telephone system in the United States began in 1993 in the form of a time-division multiple access ("TDMA") system. That TDMA digital cellular telephone system implements digital voice (dual-mode) based on the IS-54B standard promulgated by the Telecommunications Industry Association ("TIA") which specifies an analog control channel for control signals, and digital traffic channels for voice and data signals. That dual-mode digital system based on the IS-54B standard analogically controls outgoing and incoming calls and digitally carries the voice and data signals. The communication capacity of the IS-54B TDMA cellular telephone system is limited by the capacity of the analog control channel.

Because the analog control channel of the IS-54B TDMA system limits its communications capacity, a completely digital system (e.g., with a digital control channel) has been developed to more efficiently utilize frequencies. In 1994, the TIA standardized the completely digital TDMA system having a digital control channel and one or more digital traffic channels. The completely digital TDMA system is referred to as the IS-136 standard. Digitizing the control channel in the TDMA system according to the IS-136 protocol: increases the capacity of the control channel to ten times analog capacity; provides new applications such as private network service; provides a short message service; and reduces power consumption of portable cellular telephones by supporting paging of the portable telephones to prompt them out of an idle mode.

Portable cellular telephones in a conventional IS-136 TDMA system transmit and receive the digital control channel and all the digital traffic channels. The digital control channel is presently used for set-up and monitoring functions, but often has available unused or minimally-used communications capacity.

Messaging service is becoming increasingly commercially important. For messaging service to be successful there should be minimal missed messages, such as from fading. The messaging service must be close to one-hundred percent reliable. To accomplish messaging within a local area, retransmission of the broadcast messaging signals, within a local subportion of a cell, may improve reliability. (The subportion of the cell may be referred to as a micro/picocell). However, use of normal IS-136, infrastructure to rebroadcast the messaging signal within the micro/picocell would result in significant expense and complexity.

SUMMARY OF THE INVENTION

The invention provides a receiver and a base station micro/picocell retransmitter in a cellular messaging network which more efficiently uses the message communications capacity of the IS-136 digital control channel. In accordance with this invention, the base station micro/picocell retransmitter in the cellular short messaging network is designed to avoid much of the expense and complexity of networks and communications equipment presently conforming to IS-136 protocol by omitting infrastructure supporting the digital traffic channels. Eliminating infrastructure supporting transmission and reception of the digital traffic channels in the micro/picocell retransmitter reduces the cost of establishing such a network.

According to the principles of the invention, the cellular messaging network makes use of unused or minimally-used time slots in the digital control channel by supporting messaging on particular time slots of the digital control channel dedicated for short messaging information according to the IS-136 protocol and discarding other time slots, such as for signals related to the assignment of voice channels, presently stipulated by IS-136 protocol. In an illustrative embodiment, these signals relating to assignment of voice channels can be discarded since the cellular messaging network does not support the digital traffic channels. The cellular messaging network includes a switching controller connected to the wireless telephone network, which can then be coupled to the public switched telephone network. One or more radio base station micro/picocell retransmitters are coupled to the switching controller by hardwire or wireless interface. One or more receivers are coupled to the base station micro/picocell retransmitters through an IS-136 protocol digital control channel. The base station micro/picocell retransmitters discard the digital traffic channels and retransmit only the digital control channel. Each base station micro/picocell includes a connection for receiving a modulated carrier signal conforming to IS-136 protocol from the switching controller, and an internal circuit for processing the modulated carrier signal. The internal circuit demodulates the modulated carrier signal to generate a time-division multiplexed digital signal, distinguishes between signals related to the assignment of voice channels and other signals including those related to short messaging information in the multiplexed digital signal, and discards the signals related to the assignment of voice channels.

In the context of this invention, such discarding may include the absence of further processing. Similar circuitry can alternatively be provided in the receiver to perform the functions described above.

The base station micro/picocell retransmitters of the picocell cellular messaging network is able to use simplified control equipment having no traffic (i.e., voice or data) channel capability. Optionally, the base station micro/picocell retransmitter can be connected over a twisted-pair telephone line to the switching controller.

Other features and advantages of the invention will become apparent from the following detailed description, taken in conjunction with the accompanying drawing, which illustrate, by way of example, the features of the invention.

BRIEF DESCRIPTION OF THE DRAWING

In the drawing:

FIG. 3 shows a flow diagram of an exemplary operating process of a base station micro/picocell retransmitter for use in the cellular messaging network depicted in FIG. 1 in accordance with the principles of the invention; and FIG. 4 shows an exemplary base station micro/picocell retransmitter for use in the cellular messaging network depicted in FIG. 1 in accordance with the principles of the invention.

DETAILED DESCRIPTION OF THE PREFERRED EMBODIMENT

Figures 1, 2:
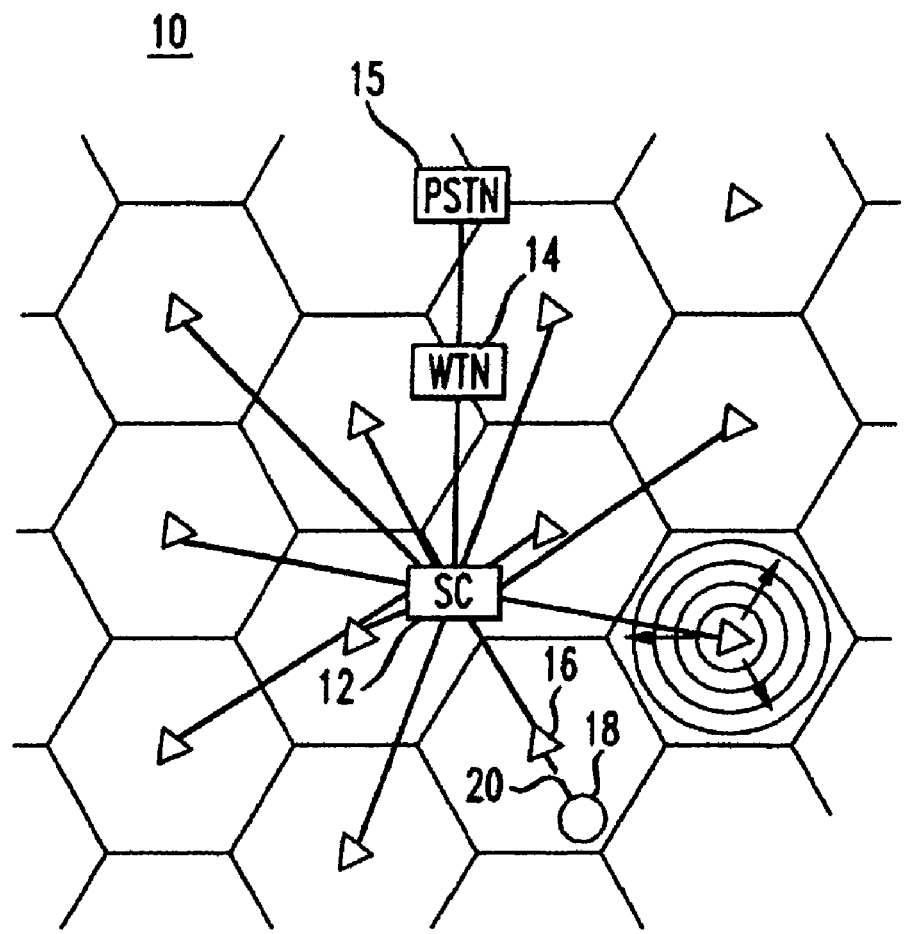
FIG. 1 shows an exemplary cellular messaging network in accordance with the principles of the invention.
FIG. 2 shows an exemplary frame of a digital control channel used for messaging in accordance with the principles of the invention.

As shown in the drawing for purposes of illustration, the invention is embodied in a cellular messaging network and communications equipment thereof which omits infrastructure supporting traffic (i.e., voice and data) channels in an IS-136 TDMA system providing a reliable, cost-efficient messaging service. A geographically larger cell is subdivided into smaller micro/picocells, wherein each micro/picocell includes a base station micro/picocell retransmitter to prevent missed messages throughout the cell. Because the base station micro/picocell retransmitters omit infrastructure supporting the digital traffic channels, the cellular messaging network is commercially practicable.

Referring to FIG. 1, a cellular messaging network 10 for a plurality of geographically contiguous micro/picocells ("cells") includes a digital switching controller ("SC") 12. The switching controller 12 is connected to the wireless telephone network ("WTN") 14 and then can be coupled to the public switched telephone network ("PSTN") 15. A plurality of radio base station micro/picocell transmitters 16 are each connected to the digital switching controller 12, either by land-line or wireless interface. A plurality of portable transceivers 18 are coupled to the plurality of base station micro/picocell retransmitters 16 through one or more IS-136 digital control channels 20. As used herein, "portable transceiver" is defined to include TDMA pagers, TDMA and CDMA receivers, portable cellular telephones, automobile telephones, and other, perhaps larger, voice and data messaging devices. The portable transceiver can have a simple design and function, performing no processing except, for example, to annunciate in response to an incoming signal. In an alternative embodiment, as a portable transceiver 18 moves from one cell to another cell, the switching controller 12 automatically switches connectivity with the respective base station micro/picocell retransmitters associated with the cells so that the portable transceiver 18 maintains continuous contact with the wireless telephone network 14. When a portable transceiver 18 is activated, the portable transceiver 18 registers with the cellular messaging network 10 using the digital control channel 20. After the initialization process, the switching controller 12 monitors signals from the portable transceiver 18 on the digital control channel 20 and controls operation of the portable transceiver 18 thereby. To send messages to a portable transceiver 18, the switching controller 12 pages for the designated portable transceiver 18 (which could be in an idle mode) and then sends messages using the digital control channel 20.

Time-division multiple access ("TDMA") is a multiplexing technique for sharing a transmission medium. The bandwidth of the transmission medium is shared by establishing a sequence of time slots ("subchannels") during which individual sources can transmit signals. The entire bandwidth of the transmission medium is periodically available to each user for a restricted time interval. Ordinarily, time slots in a TDMA system are equal in length and have a common repetition period called a frame interval. Each subchannel is assigned an amount of transmission capacity determined by the time slot duration and the repetition rate. In standard digital TDMA hierarchy, higher-level signals can be implemented as a combination of lower-level signals. Communications according to IS-136 protocol use the following four layers, as promulgated by the TIA:

Higher Layers: perform the message transfer service for short messaging service ("SMS"), and the paging service. The SMS communication configuration includes a point-to-point communication mode and a multiple address communication mode.

Layer 3: controls the portable transceiver, e.g., outgoing and incoming calls, and location registration.

Layer 2: performs dissembly, assembly and retransmission control of layer 3 messages by a data link with the radio base station micro/picocell retransmitter.

Layer 1: establishes frame synchronization, processes coding and controls TDMA.

The IS-136 standard stipulates for the digital control channel: a frequency bandwidth of 800 MHz; channel spacing of 30 KHz; a VSELP voice coding system; and QPSK modulation.

The digital control channel in an IS-136 TDMA system is structured as a series of one or more frames, as shown in FIG. 2. Each frame 22 can include, for example, a synchronization ("SYNC") slot 24, an overhead ("OH") slot 26, a slot 28 for signals related to voice channel assignment ("VCA"), and slots 30, 32, 34 for signals having short messaging service ("SMS") information directed to particular portable transceivers.

A radio base station micro/picocell retransmitter 16 (FIG. 1) in the cellular messaging network 10 receives the digital control channel and one or more digital traffic (i.e., voice or data) channels and discards the digital traffic channels. Base station micro/picocell retransmitter 16 rebroadcasts signals on the digital control channel 20 relating to voice channel assignments and short messaging information to each portable transceiver 18. In a specific embodiment, the base station micro/picocell retransmitter actively screens and discards the signals relating to voice channel assignments before rebroadcasting. The portable transceivers in the cellular messaging network monitor the digital control channel for messages. When a portable transceiver detects a signal transmitted for it, the portable transceiver may select the radio base station micro/picocell retransmitter transmitting the strongest signal. The portable transceiver may transmit an acknowledgment message by way of the digital control channel indicating to the switching controller 12 which of the base station micro/picocell retransmitters to use for further messaging with the portable transceiver.

According to the invention, communications between the portable transceivers and the radio base station micro/picocell retransmitters in the cellular messaging network use the IS-136 digital control channel protocol. Importantly, however, infrastructure to support the digital traffic channels (which are separate and distinct from the digital control channel) is omitted from the base station micro/picocell retransmitter and network equipment to reduce cost and complexity. Internal circuitry of the base station micro/picocell retransmitters can actively screen and discard signals in the digital control channel relating to assignment of voice and data traffic channels because these signals are not necessary for messaging in the cellular network as taught herein.

In an illustrative embodiment the base station micro/picocell retransmitter 16 is able to receive and transmit short messages on a digital control channel conforming to IS-136 protocol. Referring to FIG. 3, the base station micro/picocell retransmitter 16 obtains voice channel assignment signals related to the assignment of voice channels and short messaging signals based on the short messages from the digital control channel in step 36. The base station micro/picocell retransmitter distinguishes between the voice channel assignment signals and the short messaging signals in step 38. The base station micro/picocell retransmitter screens the voice channel assignment signals from further processing in step 40 before rebroadcasting the short messaging signals to the portable transceiver 18 in step 42.

Referring to FIG. 4, in another illustrative embodiment, distinguishing and screening signals relating to voice channel assignments can be performed in the base station micro/picocell retransmitter according to the principles of the invention. The base station micro/picocell retransmitter 18 can include an antenna 46 to receive a modulated carrier signal conforming to IS-136 protocol from the switching controller 12, a housing 48 made of an electromagnetic shielding material on which the antenna 46 is mounted, and an internal circuit 50 connected to the antenna 46 by way of the housing 48 to receive the modulated carrier signal. The internal circuit 50 includes a receiver front end 52 coupled to the antenna 46 to demodulate the modulated carrier signal and generate an oversampled version of the baseband digital signal. The digital signal is time-division multiplexed in TDMA format. The multiplexed digital signal presents subchannels respectively for signals related to the assignment of voice channels and other signals comprising short messaging information. The oversampled version of the multiplexed digital signal is passed to a buffer memory 54. A timing recovery circuit 56 coupled to the buffer memory 54 generates a timing recovery signal to select samples of the oversampled multiplexed digital signal from the buffer memory 54 at the proper timing. The multiplexed digital signal is passed to a demultiplexer 58. The demultiplexer 58 splits signals relating to the assignment of voice channels and other signals comprising short messaging information from the multiplexed digital signal. The signals related to the assignment of voice channels and the other signals comprising short messaging information are passed to a screening circuit 60. The screening circuit 60 discards the signals relating to the assignment of voice channels. The other signals comprising short messaging information are subsequently decoded.

Similar circuitry for performing the functions as described above can be embodied in the portable transceiver.

While several particular forms of the invention have been illustrated and described, it will also be apparent that various modifications can be made without departing from the spirit and scope of the invention.

The invention claimed is:

1. A method of receiving a message on a digital control channel for use in a cellular messaging network, comprising the following steps:

(A) receiving voice channel assignment signals related to the assignment of voice channels and short messaging signals based on the message from the digital control channel;
(B) distinguishing between the voice channel assignment signals and the short messaging signals; and
(C) discarding the voice channel assignment signals.

2. The method of claim 1, wherein:
the voice channel assignment signals and the short messaging signals are time-division multiplexed in the digital control channel.

3. The method of claim 1, wherein step (A) includes the step:
demultiplexing the digital control channel.

4. The method of claim 1, further comprising the step:
paging a receiver in the cellular messaging network using the short messaging signals.

5. A base station retransmitter for use with a digital control channel, comprising:
means for connecting to a switching controller and receiving a modulated carrier signal from the switching controller;
an internal circuit coupled for receiving the modulated carrier signal, the internal circuit comprising:
means for demodulating the modulated carrier signal to generate a multiplexed digital signal,
means for demultiplexing the multiplexed digital signal to generate voice channel assignment signals and short messaging signals, and
means for discarding the voice channel assignment signals.

6. The base station retransmitter of claim 5, wherein:
the multiplexed digital signal is presented as a series of one or more frames.

7. The base station retransmitter of claim 5, further comprising:
a buffer memory coupled to the means for demodulating which is operable to generate the multiplexed digital signal in response to a timing recovery signal.

8. The base station retransmitter of claim 7, further comprising:
a means, coupled to the buffer memory, for generating a timing recovering signal.

9. The base station retransmitter of claim 5, further comprising:
an antenna for broadcasting the short messaging signals.

10. A portable transceiver, comprising:
a receiver configured to receive a multiplexed digital signal including a voice channel assignment subchannel for voice channel assignment signals and a short messaging subchannel for short messaging signals;
a demultiplexer configured to demultiplex the multiplexed digital signal to generate a short messaging signal and a voice channel assignment signal;
a screening circuit configured to screen the voice channel assignment signal from further processing; and
a decoder that decodes the short messaging signal to obtain a message.

11. The portable transceiver of claim 10, wherein the multiplexed digital signal is TDMA signal.

12. The portable transceiver of claim 10, wherein the voice channel assignment subchannel and the short messaging subchannel are time-division multiplexed in the multiplexed digital signal.

13. The portable transceiver of claim 10 wherein the multiplexed digital signal includes a series of one or more frames.

14. The portable transceiver of claim 10, further comprising a transmitter configured to rebroadcast the short messaging signal.

15. A retransmitter for a wireless network, comprising:
   a connection configured to receive a modulated carrier signal;
   a demodulator configured to demodulate the modulated carrier signal to generate a time-division multiplexed digital signal;
   a demultiplexer configured to demultiplex the time-division multiplexed digital signal to generate a short messaging signal and a voice channel assignment signal; and
   a screening circuit configured to screen the voice channel assignment signal from further processing.

16. The retransmitter of claim 15, further comprising a decoder configured to decode the short messaging signal to obtain a message.

17. The retransmitter of claim 15, further comprising an antenna, wherein the antenna is configured to direct the modulated carrier signal to the connection.

18. The retransmitter of claim 15, wherein the demodulator is configured to generate an oversampled, demodulated time-division multiplexed digital signal, and further comprising a buffer memory configured to receive the demodulated time-division multiplexed digital signal.

19. The retransmitter of claim 15, further comprising a timing recovery circuit configured to select samples of the time-division multiplexed digital signal from the buffer memory.

20. A portable transceiver, comprising:

a receiver configured to receive a multiplexed digital signal including voice channel assignment signals and short messaging signals; and
   a circuit configured to distinguish voice channel assignment signals from short messaging information in the multiplexed digital signal and discard signal portions associated with the voice channel assignment signals.

21. The portable transceiver of claim 20, further comprising a decoder configured to obtain at least one message based on the short messaging information.

22. The portable transceiver of claim 21, further comprising a transmitter configured to transmit a signal based on the short messaging information.

23. The portable transceiver of claim 21, further comprising a decoder configured to obtain a message from the short messaging information that is directed to the portable transceiver.

24. The portable transceiver of claim 23, further comprising a transmitter configured to transmit an acknowledgement message.

\* \* \* \* \*